(12) United States Patent
Yao et al.

(10) Patent No.: US 7,550,634 B2
(45) Date of Patent: Jun. 23, 2009

(54) PROCESS FOR CONVERTING TRIGLYCERIDES TO HYDROCARBONS

(75) Inventors: Jianhua Yao, Bartlesville, OK (US); Edward L. Sughrue, II, Bartlesville, OK (US); Joseph B Cross, Bartlesville, OK (US); James B. Kimble, Bartlesville, OK (US); Hsu-Hui Hsing, Austin, TX (US); Marvin M. Johnson, Bartlesville, OK (US); Dhananjay B. Ghonasgi, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 308 days.

(21) Appl. No.: 11/342,888

(22) Filed: Jan. 30, 2006

(65) Prior Publication Data

US 2007/0175795 A1    Aug. 2, 2007

(51) Int. Cl.
*C07C 4/00* (2006.01)
(52) U.S. Cl. .......................... 585/240; 585/14; 208/142
(58) Field of Classification Search ........................ None
See application file for complete search history.

(56) References Cited

U.S. PATENT DOCUMENTS

| | | | |
|---|---|---|---|
| 2,905,636 A | 9/1959 | Watkins et al. | |
| 4,328,128 A | 5/1982 | Stanulonis et al. | |
| 4,420,388 A | 12/1983 | Bertolacini et al. | |
| 4,575,382 A | 3/1986 | Sweeney et al. | |
| 4,764,265 A | 8/1988 | Bijwaard et al. | |
| 4,992,605 A | 2/1991 | Craig et al. | |
| 5,578,090 A | 11/1996 | Bradin | |
| 5,705,722 A | 1/1998 | Monnier et al. | |
| 6,249,170 B1 | 6/2001 | Main et al. | |
| 6,864,215 B2 | 10/2002 | Dodwell et al. | |
| 2006/0161032 A1 | 7/2006 | Murzin et al. | |

FOREIGN PATENT DOCUMENTS

| | | |
|---|---|---|
| EP | 1 224 901 A1 | 7/2002 |
| EP | 1 396 531 A2 | 3/2004 |
| WO | WO2008054442 | 1/2009 |

OTHER PUBLICATIONS

National Academy of Sciences Report: E.G. Shay, Biomass and Bioenergy, 4 227 (1993) Diesel Fuel from Vegetable Oils: Status and Opportunities.

M. Stumborg, A. Wong, and E. Hogan, Bioresource Technology, 56, 13 (1996) Hydroprocessed Vegetable Oils for Diesel Fuel Improvement.

W. Baldauf and M. Rupp, Biomass Energy, Inc. Environment, 831-5 (1992) Processing of Rape Oils in Mineral Oil Refineries.

*Primary Examiner*—Tam M Nguyen (57) ABSTRACT

Processes for the conversion of hydrocarbons boiling in the temperature range of from about 80° F. to about 1000° F. to diesel boiling range hydrocarbons, and processes for increasing the cetane number and amount of $n\text{-}C_{17}$ hydrocarbon products in such processes. Diesel boiling range hydrocarbons may be produced by contacting a hydrocarbon boiling in the above-mentioned boiling range with a triglyceride-containing compound to form a mixture, and then contacting the mixture with a hydrotreating catalyst under suitable reaction conditions.

52 Claims, 5 Drawing Sheets

| Run Number | N | O | P | Q |
|---|---|---|---|---|
| Feed | LCO | 20% Yellow Grease/80% LCO | LCO | 2% Yellow Grease/98% LCO |
| Catalyst | Co-Mo (TK 574) | Co-Mo (TK 574) | Co-Mo (TK 574) | Co-Mo (TK 574) |
| H₂ rate (scf/b) | 1700 scf/b | 1700 scf/b | 1700 scf/b | 1700 scf/b |
| Liquid SV (hr⁻¹) | 2 hr⁻¹ | 2 hr⁻¹ | 2 hr⁻¹ | 2 hr⁻¹ |
| Temperature | 700°F | 700°F | 700°F | 700°F |
| Pressure | 500 psig | 500 psig | 500 psig | 500 psig |
| Density, g/mL | 0.8880 | 0.8689 | 0.8836 | 0.8838 |
| S content, ppm | 94 | 199 | 102 | 100 |
| API | 24.87 | 28.5 | 25.68 | 25.65 |
| H₂ consumption, scf/b | 400 | 767 | 654 | 582 |
| Cetane Number | 33.93 | 41.49 | 32.16 | 32.35 |
| TAN (mgKOH/g) | <0.05 | 0.3 | 0.07 | 0.7 |
| Cloud, °F | 5 | 26 | 4 | 5 |
| Pour, °F | -10 | 23 | -10 | -6 |
| Initial Boiling Point, °F | 219 | 242 | 218 | 218 |
| 10%, °F | 445 | 454 | 444 | 445 |
| 50%, °F | 538 | 554 | 536 | 537 |
| 90%, °F | 638 | 636 | 636 | 635 |
| Final Boiling Point, °F | 945 | 1058 | 738 | 718 |

FIG. 5

PROCESS FOR CONVERTING TRIGLYCERIDES TO HYDROCARBONS

FIELD OF THE INVENTION

The present invention relates generally to the conversion of triglycerides to fuel range hydrocarbons.

BACKGROUND OF THE INVENTION

There is a national interest in the discovery of alternative sources of fuels and chemicals, other than from petroleum resources. As the public discussion concerning the availability of petroleum resources and the need for alternative sources continues, government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, oils and fats. These so-called "natural" carbon resources (or renewable hydrocarbons) are widely available, and remain a target alternative source for the production of hydrocarbons. For example, it is known that oils and fats, such as those contained in vegetable oil, can be processed and used as fuel. "Bio Diesel" is one such product and may be produced by subjecting a base vegetable oil to a transesterification process using methanol in order to convert the base oil to desired methyl esters. After processing, the products produced have very similar combustion properties as compared to petroleum-derived hydrocarbons. However, the use of Bio-Diesel as an alternative fuel has not yet been proven to be cost effective. In addition, Bio-Diesel often exhibits "gelling" thus making it unable to flow, which limits its use in pure form in cold climates.

Unmodified vegetable oils and fats have also been used as additives in diesel fuel to improve the qualities of the diesel fuel, such as for example, the cetane rating and lubricity. However, problems such as injector coking and the degradation of combustion chamber conditions have been associated with these unmodified additives. Since cetane ($C_{16}H_{34}$), heptadecane ($C_{17}H_{36}$) and octadecane ($C_{18}H_{38}$) by definition have very good ignition properties (expressed as cetane rating), it is often desired to add paraffinic hydrocarbons in the $C_{16}$-$C_{18}$ range, provided that other properties of the additive (such as for example, viscosity, pour point, cloud point, etc., are congruent with those of the diesel fuel). Processes for converting vegetable oil into hydrocarbons have been achieved. However, oftentimes, in order to achieve the conversion, harsh reaction conditions are employed, or the products that result from the reaction are undesirable, or the product does not exhibit sufficient physical properties (such as for example, pour point and/or cloud point) for use in the diesel fuel. In addtion, these processes are often complex and costly.

As such, development of a process for producing hydrocarbons in the diesel fuel boiling range from triglycerides, such as vegetable oils, would be a significant contribution to the art. In addition, development of a process for producing hydrocarbons in the diesel fuel boiling range from triglycerides, such as vegetable oils, which yield significant quantities of desirable hydrocarbon products such as n-$C_{17}$ fractions, would be a significant contribution in the art. Furthermore, development of a conversion process resulting in products with improved physical properties, and products that improve the cetane rating of diesel fuel would be a significant contribution to the art. Still further, development of a process to convert triglycerides to diesel range materials having an enhanced cetane number over that of the feedstock would be a significant contribution to the art and to the economy.

SUMMARY OF THE INVENTION

Accordingly, the present invention provides a process for the conversion of triglycerides, such as for example, vegetable oils, to diesel boiling range hydrocarbons under hydrotreating conditions.

The present invention also provides an improved process for the conversion of triglycerides to diesel boiling range hydrocarbons, which produces an improved yield of reaction products including diesel boiling range hydrocarbons, such as for example $C_{17}$-$C_{19}$ fractions and a hydrocarbon product with improved cetane number, cloud and pour point, hydrogen consumption and total acid number properties.

The present invention further provides a process for converting triglyceride-containing compounds, including vegetable oils, greases, animal fats and the like, to diesel boiling-range hydrocarbons.

In one embodiment of the present invention, a process is provided for the conversion of triglyceride-containing compounds, such as vegetable oils, comprising, consisting of, or consisting essentially of, contacting a middle distillate hydrocarbon boiling in the temperature range of from about 80° F. to about 1000° F. and a triglyceride to form a mixture. The mixture is then contacted in a fixed bed reactor with a catalyst under conditions sufficient to produce a reaction product containing diesel boiling range hydrocarbons. The reaction conditions may include a pressure of less than about 600 psig and a temperature in the range of from about 600° F. to about 800° F. The reaction conditions may also include contacting the mixture with a hydrogen-containing diluent in an amount in the range of from about 300 standard cubic feet per barrel of the mixture to about 4000 standard cubic feet per barrel of the mixture, and a liquid hourly space velocity in the range of from about 0.5 hr$^{-1}$ to about 4 hr$^{-1}$.

In a second embodiment of the present invention, another process is provided for the conversion of triglyceride-containing compounds comprising, consisting of, or consisting essentially of, contacting a hydrocarbon boiling in the temperature range of from about 80° F. to about 1000° F. and a triglyceride to form a mixture. The mixture may then be contacted in a fluidized bed reactor with a catalyst under conditions sufficient to produce a reaction product containing diesel boiling range hydrocarbons. The reaction conditions may include a pressure of less than about 600 psig and a temperature in the range of from about 600° F. to about 800° F.

The inventive processes generally results in an increase in cetane number and also a reaction product that can contain a greater amount of n-$C_{17}$ hydrocarbon products than n-$C_{18}$ hydrocarbon products.

Other objects, advantages and embodiments of the invention will be apparent from the following detailed description of the invention and the appended claims.

DETAILED DESCRIPTION OF THE INVENTION

Triglycerides or fatty acids of triglycerides, or mixtures thereof, may be converted in accordance with the present invention to form a hydrocarbon mixture useful for liquid fuels and chemicals. The term, "triglyceride," is used generally to refer to any naturally occurring ester of a fatty acid and/or glycerol having the general formula $CH_2(OCOR_1)CH(OCOR_2)CH_2(OCOR_3)$, where $R_1$, $R_2$, and $R_3$ are the same or different, and may vary in chain length. Vegetable oils, such as for example, canola and soybean oils contain triglycerides with three fatty acid chains. Useful triglycerides in the present invention include, but are not limited to, triglycerides that may be converted to hydrocarbons when contacted under suitable reaction conditions. Examples of triglycerides useful in the present invention include, but are not limited to, vegetable oils including soybean and corn oil, peanut oil, sunflower seed oil, coconut oil, babassu oil, grape seed oil, poppy seed oil, almond oil, hazelnut oil, walnut oil, olive oil, avocado oil, sesame, oil, tall oil, cottonseed oil, palm oil, ricebran oil, canola oil, cocoa butter, shea butter, butyrospermum, wheat germ oil, illipse butter, meadowfoam, seed oil, rapeseed oil, borange seed oil, linseed oil, castor oil, vernoia oil, tung oil, jojoba oil, ongokea oil, yellow grease (for example, as those derived from used cooking oils), and animal fats, such as tallow animal fat, beef fat, and milk fat, and the like and mixtures and combinations thereof.

Any suitable triglyceride can be used in combination with the hydrocarbon in the starting material. Preferably, the triglyceride is selected from the group consisting of vegetable oil, yellow grease (used restaurant oil), animal fats, and combinations of any two or more thereof.

The amount of triglyceride used as the starting material in the present invention may vary depending on the size of the commercial process or suitability of the mixing/reaction vessel. Generally, triglyceride-containing materials are generally present in an amount in the range of from about 0.1 to about 100 percent by weight, based on the total weight percent of the mixture. In one embodiment of the present invention, the triglyceride-containing material is present in an amount of from about 2 weight percent to about 80 weight percent, based on the total weight of the mixture. Most preferably, the triglyceride-containing material is present in an amount of less than 50 weight percent, based on the total weight of the mixture.

Triglyceride starting materials may be processed alone or in combination with other hydrocarbons. The hydrocarbons boil at a temperature of from about 80° F. to about 1000° F. Examples of suitable hydrocarbons include middle distillate fuels. Middle distillate fuels generally contain hydrocarbons that boil in the middle distillate boiling range in the range from about 300° F. to about 750° F. Typical middle distillates may include for example, jet fuel, kerosene, diesel fuel, light cycle oil, atmospheric gas oil, and vacuum gas oil. If a middle distillate feed is employed in the process of the present invention, the feed generally may contain a mixture of hydrocarbons having a boiling range (ASTM D86) of from about 300° F. to about 750° F. In one embodiment of the present invention, the middle distillate feed has a boiling range of from about 350° F. to about 725° F. In addition, the middle distillate feed may have a mid-boiling point (ASTM D86) of greater than about 350° F. In one embodiment of the present invention, the middle distillate feed has a mid-boiling point of greater than about 400° F. In another embodiment of the present invention, the middle distillate feed has a mid-boiling point of greater than about 450° F.

In one embodiment of the present invention, the middle distillate feed has an API gravity (ASTM D287) of from about 20 to about 50. In addition, middle distillate feeds used in the present invention generally have a minimum flash point (ASTM D93) of greater than about 80° F. In one embodiment of the present invention, the middle distillate feed has a minimum flash point of greater than about 90° F. A preferred middle distillate feed employed in the present invention is light cycle oil (LCO). In addition, one or more triglycerides can nux with a middle distillate feed.

In addition to middle distillate fuels, other suitable hydrocarbons include, but are not limited to, gasoline, naphtha, and atmospheric tower bottom.

Hydrocarbons useful in the present invention generally may contain a quantity of aromatics, olefins, and sulfur, as well as paraffins and naphthenes. The amount of aromatics in the hydrocarbon generally may be in an amount in the range of from about 10 to about 90 weight percent aromatics based on the total weight of the hydrocarbon. In one embodiment of the present invention, aromatics are present in an amount in the range of from about 20 to about 80 weight percent, based on the total weight of the hydrocarbon. The amount of olefins in the hydrocarbon generally may be in an amount of less than about 10 weight percent olefins based on the total weight of the hydrocarbon. In one embodiment of the present invention, olefins are present in an amount of less than about 5 weight percent olefins. In another embodiment of the present invention, olefins are present in an amount of less than about 2 weight percent olefins.

The amount of sulfur in the hydrocarbon can generally be greater than about 50 parts per million by weight (ppmw) sulfur. In one embodiment of the present invention, sulfur is present in an amount in the range of from about 100 ppmw to about 50,000 ppmw sulfur. In another embodiment of the present invention, sulfur is present in the range of from about 150 ppmw to 4,000 ppmw. As used herein, the term "sulfur" denotes elemental sulfur, and also any sulfur compounds normally present in a hydrocarbon stream, such as diesel fuel. Examples of sulfur compounds which may be removed from a hydrocarbon stream through the practice of the present invention include, but are not limited to, hydrogen sulfide, carbonyl sulfide (COS), carbon disulfide (CS) mercaptans (RSH), organic sulfides (R—S—R), organic disulfides (R—S—S—R), thiophene, substituted thiophenes, organic trisulfides, organic tetrasulfides, benzothiophene, alkyl thiophenes, dibenzothiophene, alkyl benzothiophenes, alkyl dibenzothiophenes, and the like, and mixtures thereof as well as heavier molecular weights of the same, wherein each R can be an alkyl, cycloalkyl, or aryl group containing 1 to about 10 carbon atoms.

Generally, the hydrocarbon may be generally present in an amount in the range of from about 0.1 to about 99.9 percent, based on the total weight percent of the mixture. Preferably, the hydrocarbon is present in an amount in the range of from about 80 weight percent to about 99.9 weight percent based on the total weight of the mixture.

Generally, triglycerides and/or mixtures of triglyceride and a hydrocarbon may then be contacted with a catalyst composition under a condition sufficient to produce a reaction product containing diesel boiling range hydrocarbons. Useful catalyst compositions in the present invention include catalysts effective in the conversion of triglycerides to hydrocarbons when contacted under suitable reaction conditions. Examples of suitable catalysts include hydrotreating catalysts. The term "hydrotreating" as used herein, generally describes a catalyst that is capable of utilizing hydrogen to accomplish saturation of unsaturated materials, such as aromatic compounds. Examples of hydrotreating catalysts useful in the present invention include, but are not limited to, materials containing compounds selected from Group VI and Group VIII metals, and their oxides and sulfides. Examples of hydrotreating catalysts include but are not limited to alumina supported cobalt-molybdenum, nickel sulfide, nickel-tungsten, cobalt-tungsten and nickel-molybdenum (such as for example, as commercially available under the trade designation TK-573 from Haldor Topsoe). Hydrotreating catalysts of the present invention may also be promoted with a halogen, such as fluorine, in order to enhance the production of desired hydrocarbons.

The metal of the catalyst useful in the present invention is usually distributed over the surface of a support in a manner than maximizes the surface area of the metal. Examples of suitable support materials for the hydrogenation catalysts include, but are not limited to, silica, silica-alumina, aluminum oxide ($Al_2O_3$), silica-magnesia, silica-titania and acidic zeolites of natural or synthetic origin. The metal catalyst may be prepared by any method known in the art, including combining the metal with the support using conventional means including but not limited to impregnation, ion exchange and vapor deposition. Preferably, the catalyst contains molybdenum and cobalt supported on alumina or molybdenum and nickel supported on alumina. In addition, fluorine can be incorporated into or onto a nickel-molybdenum or cobalt-molybdenum catalyst by impregnating said catalyst with ammonium bifluoride.

Other catalysts useful in the present invention are sorbent compositions. Sorbent compositions useful in the present invention may be any sorbent composition useful in converting triglyceride-containing materials or a mixture of triglyceride-containing material and a middle-distillate feed into hydrocarbons. Sorbent compositions can be used in either the fixed-bed reactor or the fluidized bed reactor embodiments.

A useful sorbent composition can be any sufficiently fluidizable, circulatable, and regenerable zinc oxide-based composition. A description of such a sorbent composition is provided in U.S. Pat. No. 6,429,170 and U.S. Pat. No. 6,864,215, the entire disclosures of which are incorporated herein by reference.

The sorbent composition comprises zinc oxide and a reduced-valence promoter metal component. The promoter metal is generally present as a substitutional solid metal solution with zinc.

The reduced-valence promoter metal component of the reduced sorbent preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component shall denote a promoter metal component having a valence which is less than the valence of the promoter metal component in its common oxidized state. More specifically, the solid sorbent employed in the process should include a promoter metal component having a valence which is less than the valence of the promoter metal component of the sorbent composition before it is reduced. Most preferably, substantially the entire promoter metal component of the reduced solid sorbent has a valence of zero. In addition to zinc oxide and the reduced-valence promoter metal component, the sorbent employed in the present invention may further comprise a porosity enhancer and an aluminate. The aluminate is preferably a promoter metal-zinc aluminate substitutional solid solution. The porosity enhancer, when employed, can be any compound which ultimately increases the macroporosity of the solid sorbent particles. Preferably, the porosity enhancer is perlite. Generally, the zinc oxide is present in the sorbent composition in an amount in the range of from about 10 to about 90 weight percent, based on the total weight of the sorbent composition. The substitutional solid metal solution is generally present in an amount in the range of from about 5 to about 70 weight percent based on the total weight of the sorbent composition and the promoter metal-zinc aluminate substitutional solid solution is present in an amount in the range of from about 2 to about 50 weight percent, based on the total weight of the sorbent composition.

The process of the present invention can be carried out in any suitable reaction zone that enables intimate contact of the reactants and control of the operating conditions under a set of reaction conditions that include total pressure, temperature, liquid hourly space velocity, and hydrogen flow rate. The reactants may be added to the reaction chamber in any suitable manner or in any suitable order. The catalyst can be added first to the reactants and thereafter, fed with hydrogen. In the present invention, either fixed bed reactors or fluidized bed reactors can be used. As used herein, the term "fluidized bed reactor" denotes a reactor wherein a fluid feed can be contacted with solid particles in a manner such that the solid particles are at least partly suspended within the reaction zone by the flow of the fluid feed through the reaction zone and the solid particles are substantially free to move about within the reaction zone as driven by the flow of the fluid feed through the reaction zone. As used herein, the term "fluid" denotes gas, liquid, vapor and combinations thereof. One example of a fluidized bed reactor that can be usefull in the present invention can be found in U.S. Pat. No. 6,890,877, the entire disclosure of which is herein incorporated by reference.

Generally, the reaction conditions at which the reaction zone is maintained generally include a temperature in the range of from about 600° F. to about 800° F. Preferably, the temperature is in the range of from about 700° F. to about 800° F.

In accordance with the present invention, regardless of whether a fixed or fluidized reactor is used, the pressure is generally in the range of from about 100 pounds per square inch gauge (psig) to about 750 psig. Preferably, in a fixed bed reactor, the pressure is in the range of from about 100 psig to about 350 psig. Most preferably, in a fixed bed reactor, the pressure is about 150 psig. In a fluidized bed reactor, the pressure is preferably in the range of from about 400 psig to about 750 psig. Most preferably, in a fluidized bed reactor, the pressure is about 500 psig.

As used herein, "liquid hourly space velocity" or "LHSV" is defined as the numerical ratio of the rate at which the reactants are charged to the reaction zone in barrels per hour at standard conditions of temperature and pressure (STP) divided by the barrels of catalyst contained in the reaction zone to which the reactants are charged. In the accordance with the present invention, the LHSV is generally in the range of from about 0.5 $HR^{-1}$ to about 10 $HR^{-1}$. In one embodiment of the present invention, the LHSV is in the range of from about 1.0 $HR^{-1}$ to about 5 $HR^{-1}$. In another embodiment of the present invention, the LHSV is in the range of from about 1.5 $HR^{-1}$ to about 4.0 $HR^{-1}$. In still another embodiment of the present invention, the LHSV is in the range of from about 1.8 $HR^{-1}$ to 3.0 $HR^{-1}$.

The processes of the present invention include contacting a triglyceride-containing material and/or a mixture of triglyceride-containing material and middle distillate fuel with a hydrogen-containing diluent. Generally, the hydrogen-containing diluent employed in the process of the present invention contains more than about 25 volume percent hydrogen based on the total volume of the hydrogen-containing diluent. Preferably, the hydrogen containing diluent contains more than about 50 volume percent hydrogen. More preferably, the hydrogen containing diluent contains more than about 75 volume percent hydrogen.

The rate at which the hydrogen-containing diluent is charged to the reaction zone is generally in the range of from about 300 standard cubic feet per barrel (SCFB) of reactants to about 10,000 SCFB. In one embodiment of the present invention, the hydrogen-containing diluent is charged to the reaction zone in the range of from about 1,200 SCFB to about 8,000 SCFB. In another embodiment of the present invention, the hydrogen-containing diluent is charged to the reaction zone in the range of from about 2,500 SCFB to about 6,000 SCFB. In another embodiment of the present invention, the hydrogen-containing diluent is charged to the reaction zone in the range of from about 3,000 SCFB to 5,000 SCFB. Generally, the triglyceride-containing material, optional middle distillate fuel, and hydrogen-containing diluent may be simultaneously introduced into the reaction zone via a common inlet port(s). In one embodiment of the present invention, die hydrocarbon, triglyceride and hydrogen-containing diluent are combined prior to introduction into the reaction zone, and are thereafter co-fed into the reaction zone.

Generally, the hydrogen consumption rate under reaction conditions is proportional to the pressure of the reaction conditions employed. In one embodiment of the present invention, hydrogen may be consumed in an amount up to the amount of hydrogen initially charged to the reaction zone. In another embodiment of the present invention, the amount of hydrogen consumed in the reaction at a pressure of less than about 500 psig is less than the amount of hydrogen consumed in the reaction at a pressure of about 500 psig.

In one embodiment of the present invention, sulfur compounds present in the hydrocarbon can be removed from the hydrocarbon during the processes of the present invention, especially when a sorbent composition is used. Generally, the initial amount of sulfur present in the hydrocarbon is greater than 2500 ppm.

Generally, hydrocarbon products of the present invention have a sulfur content that is substantially less than the sulfur content present in the reaction feed. Preferably, the sulfur content of the product is at least 25% less than the sulfur content present in the reaction feed. More preferably, the sulfur content of the product is at least 50% less than the sulfur content present in the reaction feed. Most preferably, the sulfur content of the product is at least 75% less than the sulfur content present in the reaction feed.

The reaction product, in accordance with the present invention, generally comprises gas and liquid fractions containing hydrocarbon products, which include, but ate not limited to, diesel boiling-range hydrocarbons. The reaction product generally comprises long chain carbon compounds having 13-20 or more carbon atoms per molecule. Preferably, the reaction product comprises carbon compounds having 15 to 18 or more carbon atoms per molecule. In addition, the reaction product can further comprise by-products of carbon monoxide and carbon dioxide ($CO_x$).

Preferably, the hydrocarbon reaction product contains a greater amount of n-$C_{17}$ fractions than n-$C_{18}$ fractions. More preferably, the n-$C_{17}$/n-$C_{18}$ fraction is greater than about 1. Most preferably, the n-$C_{17}$/n-$C_{18}$ fraction is greater than about 1.2. In a fixed bed reactor, the n-$C_{17}$/n-$C_{18}$ fraction is generally increased when the reaction conditions are at pressures generally in the range of from about 100 psig to about 200 psig. In addition, it has been discovered that lower reaction pressures can result in the greater production of n-$C_{17}$, less hydrogen consumption, and lower product cloud and pour points. A reduction in pressure can also promote decarboxylation (i.e., removal of $CO_2$) over dehydration to give a higher ratio of n-$C_{17}$/n-$C_{18}$ and a lower consumption of hydrogen.

The acid content of the hydrocarbon product is measured by the total acid number or "TAN." The total acid number (TAN), as used herein, is defined as milligrams of potassium hydroxide (KOH) necessary to neutralize the acid in 1 gram of oil and is determined using ASTM test method D 644-95 (Test Method for Neutralization Number by Potentiometric Titration). Generally, the total acid number for a yellow grease feed stock is in the range of greater than about 2 mg/KOH/g. In accordance with the present invention, the total acid number for the hydrocarbon product produced in accordance with the present invention will be less than the TAN of the yellow grease included in the original feedstock.

The cetane number of the hydrocarbon product is determined using ASTM test method D 613.65. With a light cycle oil (LCO) feedstock, the cetane number is typically less than 28 and may in some instances be less than 26 or less than 24. Generally, the cetane number of the hydrocarbon product produced in accordance with the present invention will have a cetane number greater than that of the original feedstock. The cetane number of the hydrocarbon product can also have a higher cetane number by varying the reaction conditions are modified, for example, when the reaction conditions in a fixed bed reactor are at pressures generally in the range of from about 100 psig to about 200 psig.

The pour point of the hydrocarbon product produced in accordance with the present invention is determined using ASTM test method D 97. Generally, the pour point is the lowest temperature at which a petroleum product will begin to flow and is measured at intervals of 5° F. This interval gives a range in which to account for error inherent in the measuring procedure. For example, a sample with a pour point of 10.5° F. and a sample with a pour point of 14.5° F. would be labeled as having a pour point of 15° F. Generally, LCO feed stocks useful in the present invention have a pour point of less than 20° F., and may have pour points less than 10° F., or less than 5° F.

The cloud point of the hydrocarbon product produced in accordance with the present invention is determined using ASTM test method D 2500. Generally, the cloud point is the temperature at which dissolved solids, such as wax crystals, begin to form in a petroleum product as it is cooled. Generally, feed stocks useful in the present invention exhibit a cloud point of 25° F., and may have cloud points less than 20° F., or less than 10° F.

The following examples are presented to further illustrate the present invention and are not to be construed as unduly limiting the scope of this invention.

EXAMPLE I

This example illustrates a process of converting triglyceride-containing materials to diesel boiling-range hydrocarbon products and properties of the products when produced in accordance with the present invention. This example specifically illustrates the effect of reaction conditions on the total acid number (TAN) of the product as well as the effect on hydrogen consumption.

As shown in Table I below, light cycle oil (LCO), and mixtures of LCO and various triglyceride-containing materials, including vegetable oil, yellow grease (derived from used restaurant cooking oil), and animal fat (specifically, beef fat) were co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $HR^{-1}$, an $H_2$ flow rate of 1760 scf/b, and a temperature of 750° F. The pressure of the reaction was varied as indicated below.

TABLE I

Effect of Pressure

| Run Number | CONTROL | A | B | C | D |
|---|---|---|---|---|---|
| Feed | 100% LCO | 20% Used Restaurant Oil/ 80% LCO | 20% Used Restaurant Oil/ 80% LCO | 20% Beef fat/ 80% LCO | 20% Beef fat/ 80% LCO |
| Catalyst | Co/Mo $(Al_2O_3)$ | Co/Mo $(Al_2O_3)$ | Co/Mo $(Al_2O_3)$ | Co/Mo $(Al_2O_3)$ | Co/Mo $(Al_2O_3)$ |
| $H_2$ rate (scf/b) | 1760 scf/b | 1760 scf/b | 1760 scf/b | 1760 scf/b | 1760 scf/b |
| Liquid SV (hr−1) | 2 $hr^{-1}$ | 2 $hr^{-1}$ | 2 $hr^{-1}$ | 2 $hr^{-1}$ | 2 $hr^{-1}$ |
| Feed TAN (mgKOH/g) | n/a | 2.91 | 2.91 | 0.24 | 0.24 |
| Temperature | 750° F. | 750° F. | 750° F. | 750° F. | 750° F. |
| Pressure | 500 psig | 500 psig | 150 psig | 500 psig | 150 psig |
| Product Cetane No. | 30.1[1] | 40.3 | 42.2 | 38.93 | 42.01 |
| Product TAN No. (mgKOH/g) | n/a | 4.44 | <0.05 | 4.00 | 0.12 |
| $H_2$ consumption (scf/b) | n/a | 578 | 397 | 716 | 330 |

[1] Untreated LCO had a cetane number of 27.9 as measured by a standard engine test.

As shown in Table I, for the above reaction conditions, for example, the TAN number for the product resulting from hydrotreatmnent of 20% yellow grease in LCO was 4.44. When the pressure is reduced from 500 psig to 150 psig, the TAN number is less than 0.05.

EXAMPLE II

This example illustrates a process of converting triglyceride-containing materials to diesel boiling-range hydrocarbon products and properties of the products when produced in accordance with the present invention. This example specifically illustrates improvement in cetane number for reaction products produced in accordance with the present invention.

As shown in Table II below, light cycle oil (LCO), and mixtures of LCO and various triglyceride-containing materials, including vegetable oil, yellow grease (derived from used restaurant cooking oil), and animal fat (specifically, beef fat) was co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $hr^{-1}$, an $H_2$ flow rate of 1760 scf/b, and a temperature of 750° F. The pressure of the reaction was 500 psig.

TABLE II

Cetane Number

| | Run Number | | | |
|---|---|---|---|---|
| | CONTROL | C | E | F |
| Feed | 100% LCO | 20% Beef fat/80% LCO | 20% Used Restaurant Oil/ 80% LCO | 20% Vegetable Oil/80% LCO |
| Catalyst | Co/Mo $(Al_2O_3)$ | Co/Mo $(Al_2O_3)$ | Co/Mo $(Al_2O_3)$ | Co/Mo $(Al_2O_3)$ |
| $H_2$ rate (scf/b) | 1760 scf/b | 1760 scf/b | 1760 scf/b | 1760 scf/b |
| Liquid SV ($hr^{-1}$) | 2 $hr^{-1}$ | 2 $hr^{-1}$ | 2 $hr^{-1}$ | 2 $hr^{-1}$ |
| Temperature | 750° F. | 750° F. | 750° F. | 750° F. |
| Pressure | 500 psig | 500 psig | 500 psig | 500 psig |
| Product Cetane No. | 30.1 | 38.93 | 40.3 | 41.3 |

As shown in Table II, the addition of beef fat, used restaurant oil and vegetable oil yielded an improvement in cetane number, as compared to the control (with LCO only).

EXAMPLE III

This example illustrates a process of converting triglyceride-containing materials to diesel boiling-range hydrocarbon products and properties of the products when produced in accordance with the present invention. This example specifically illustrates the effect on sulfur removal for products produced in accordance with the present invention.

As shown in Table III below, light cycle oil (LCO), and mixtures of LCO and yellow grease (derived from used restaurant cooking oil) was co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $HR^{-1}$, and an $H_2$ flow rate of 1760 scf/b. As shown in Table III below, both the LCO only feed and the 20% used restaurant oil/80% LCO feed were run under identical reaction conditions but at temperatures of 650° F., 700° F. and 750° F.

TABLE III

Impact on sulfur removal.

| | Run | |
|---|---|---|
| | CONTROL | E |
| Feed | 100% LCO | 20% Used Restaurant Oil/ 80% LCO |
| Catalyst | Co/Mo $(Al_2O_3)$ | Co/Mo $(Al_2O_3)$ |
| $H_2$ rate (scf/b) | 1760 scf/b | 1760 scf/b |
| Liquid SV ($hr^{-1}$) | 2 $hr^{-1}$ | 2 $hr^{-1}$ |

TABLE III-continued

Impact on sulfur removal.

| | Run | |
|---|---|---|
| | CONTROL | E |
| Pressure | 500 psig | 500 psig |
| Product S ppm at 650° F. | 157 | 486 |
| Product S ppm at 700° F. | 44 | 180 |
| Product S ppm at 750° F. | 55 | 47 |

As shown in Table III, there is minimal impact of sulfur removal at 750° F.

EXAMPLE IV

This example illustrates a process of converting triglyceride-containing materials to diesel boiling-range hydrocarbon products and properties of the products when produced in accordance with the present invention. This example specifically illustrates the effect of reaction conditions on reaction products, including the ratio of $n\text{-}C_{17}/n\text{-}C_{18}$ products, hydrogen consumption and cloud and pour points.

As shown in Table IV below, a 20% LCO/80% vegetable oil mixture was co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $HR^{-1}$, an $H_2$ flow rate of 1760 scf/b, and a temperature of 750° F. The pressure of the reaction was varied as indicated below.

TABLE IV

Product properties (ratio of $n\text{-}C_{17}/n\text{-}C_{18}$, hydrogen consumption, cloud and pour points)

| | Run Number | |
|---|---|---|
| | E | B |
| Feed | 20% Used Restaurant Oil/80% LCO | 20% Used Restaurant Oil/80% LCO |
| Catalyst | Co/Mo ($Al_2O_3$) | Co/Mo ($Al_2O_3$) |
| $H_2$ rate (scf/b) | 1760 scf/b | 1760 scf/b |

TABLE IV-continued

Product properties (ratio of $n\text{-}C_{17}/n\text{-}C_{18}$, hydrogen consumption, cloud and pour points)

| | Run Number | |
|---|---|---|
| | E | B |
| Liquid SV ($hr^{-1}$) | 2 $hr^{-1}$ | 2 $hr^{-1}$ |
| Feed TAN (mgKOH/g) | 2.91 | 2.91 |
| Temperature | 750° F. | 750° F. |
| Pressure | 500 psig | 150 psig |
| Product Cetane No. | 40.3 | 42.2 |
| Product TAN No. (mgKOH/g) | 4.44 | <0.05 |
| $H_2$ consumption (scf/b) | 578 | 397 |
| $n\text{-}C_{17}/n\text{-}C_{18}$ ratio | 0.83 | 1.22 |
| Cloud Point (° F.) | 34.1 | 27.4 |
| Pour Point (° F.) | 24.0 | 21.0 |

As illustrated in Table V, a decarboxylation reaction was promoted at lower reaction pressure (150 psig versus 500 psig), which resulted in more $n\text{-}C_{17}$ being produced, which lead to less hydrogen consumption and lower product cloud and pour points.

EXAMPLE V

This example illustrates a process of converting triglyceride-containing materials to diesel boiling-range hydrocarbon products and properties of the products when produced in accordance with the present invention. This example specifically illustrates the effect of using a sorbent composition as catalyst. As shown in Table VI below, light cycle oil (LCO), and mixtures of LCO and vegetable oil was co-fed with hydrogen through a fluidized bed reactor under diesel desulfutizing conditions and employing a sorbent containing 14-18% nickel oxide and 48-55% zinc oxide and prepared in accordance with U.S. Pat. No. 6,429,170 incorporated herein by reference, (denoted "sorbent" in Table VI below). The reaction conditions included an LHSV of 2 $HR^{-1}$, a pressure of 500 psig, and at temperatures in the range of from about 700° F. to about 800° F. A mixture of 10 weight percent vegetable oil and 90 weight percent LCO was prepared, and thereafter fed into the reactor. Properties of the LCO used in the present example, including sulfur content and cetane number, are shown in Table VI below. All liquid products were analyzed for sulfur and carbon number distribution (CND), the results of which are shown in Table VI below as well as in FIGS. 1-4.

TABLE VI use of sorbent composition as catalyst.

| Feed | $LCO^1$ at 700 F | $LCO^1$ at 750 F | $LCO^1$ + 10 wt % Vegetable Oil at 700° F. | $LCO^1$ + 10 wt % Vegetable Oil at 750° F. | $LCO^1$ + 10 wt % Vegetable Oil at 800° F. |
|---|---|---|---|---|---|
| Catalyst | Sorbent | Sorbent | Sorbent | Sorbent | Sorbent |
| Pressure | 500 psig | 500 psig | 500 psig | 500 psig | 500 psig |
| WHSV | 2 $hr^{-1}$ | 2 $hr^{-1}$ | 2 $hr^{-1}$ | 2 $hr^{-1}$ | 2 $hr^{-1}$ |
| Sulfur, ppmw (product) | 23 ppmw | 9 ppmw | 38 ppmw | n/a | n/a |
| Cetane Number | n/a | 29.13 | 33.66 | n/a | n/a |
| TAN | n/a | n/a | <0.05 mgKOH/g | n/a | n/a |

[1]Sulfur content of LCO feed is 3600 ppmw; total aromatics of LCO feed by SFC, wt % is 68.8.

Figure 1:
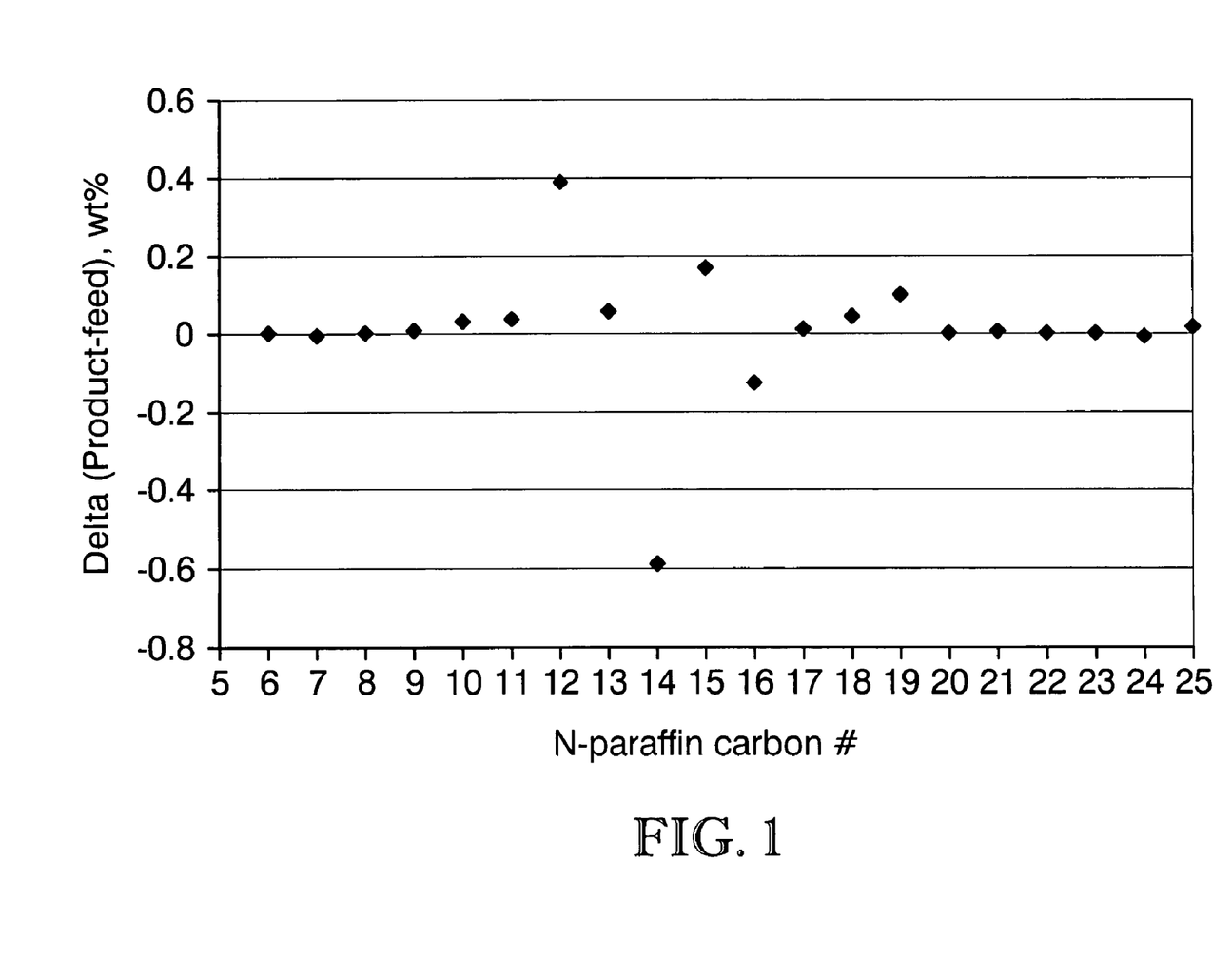
FIG. 1 is a plot of the net n-paraffin carbon distribution (CND) of LCO feed and product using a sorbent composition in accordance with the present invention.

The net n-paraffin carbon number distribution (CND) of the LCO feed (alone) and product are plotted in FIG. 1. The net n-paraffin CND for the LCO+10 wt % vegetable oil feeds (at 700° F., 750° F., and 800° F.) are plotted in FIGS. 2-4 respectively.

Figure 2:
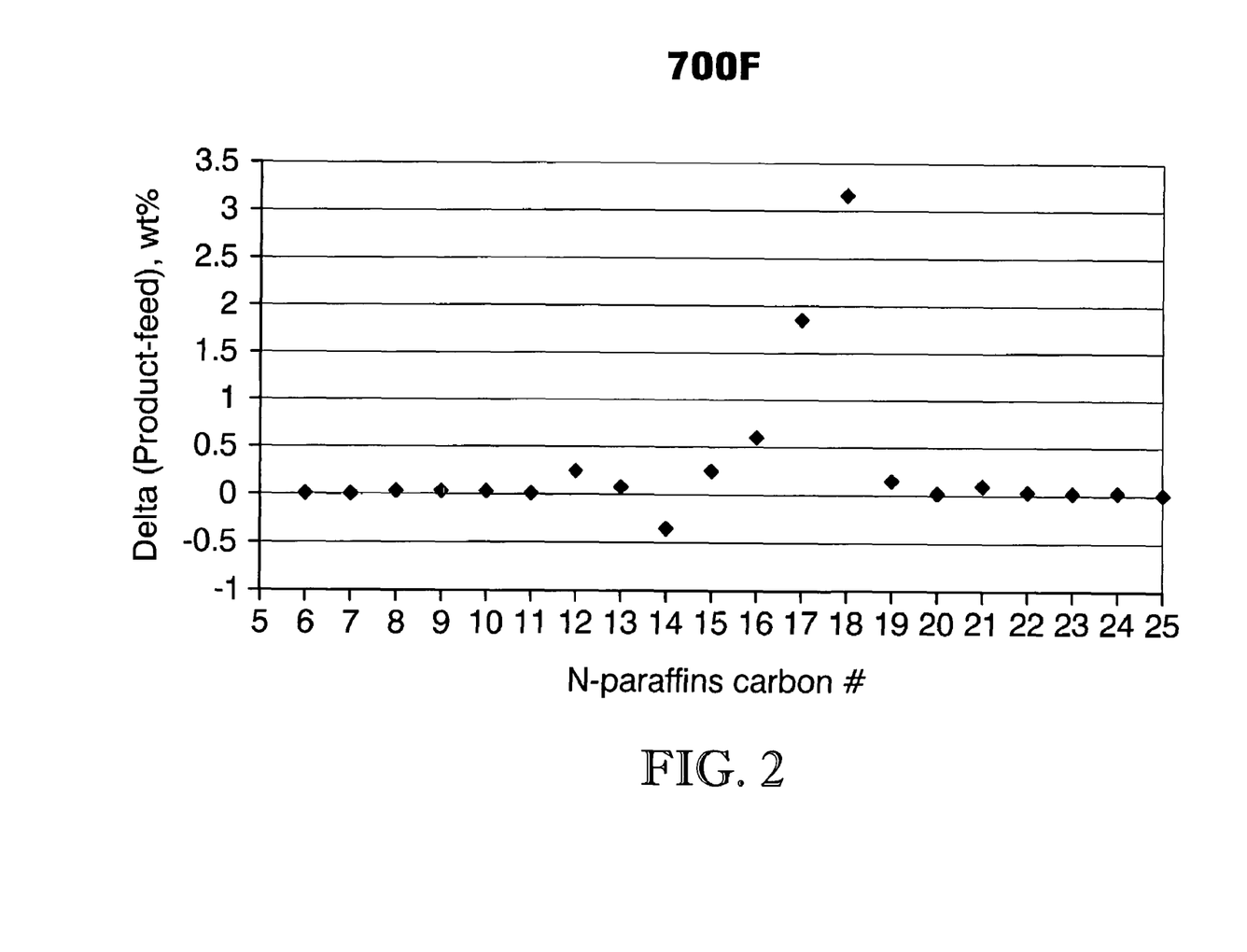
FIGS. 2-4 are plots of the net n-paraffin carbon distribution (CND) of LCO and 10 weight percent vegetable oil feeds at 700° F., 750° F., and 800° F., respectively.
Figure 3:
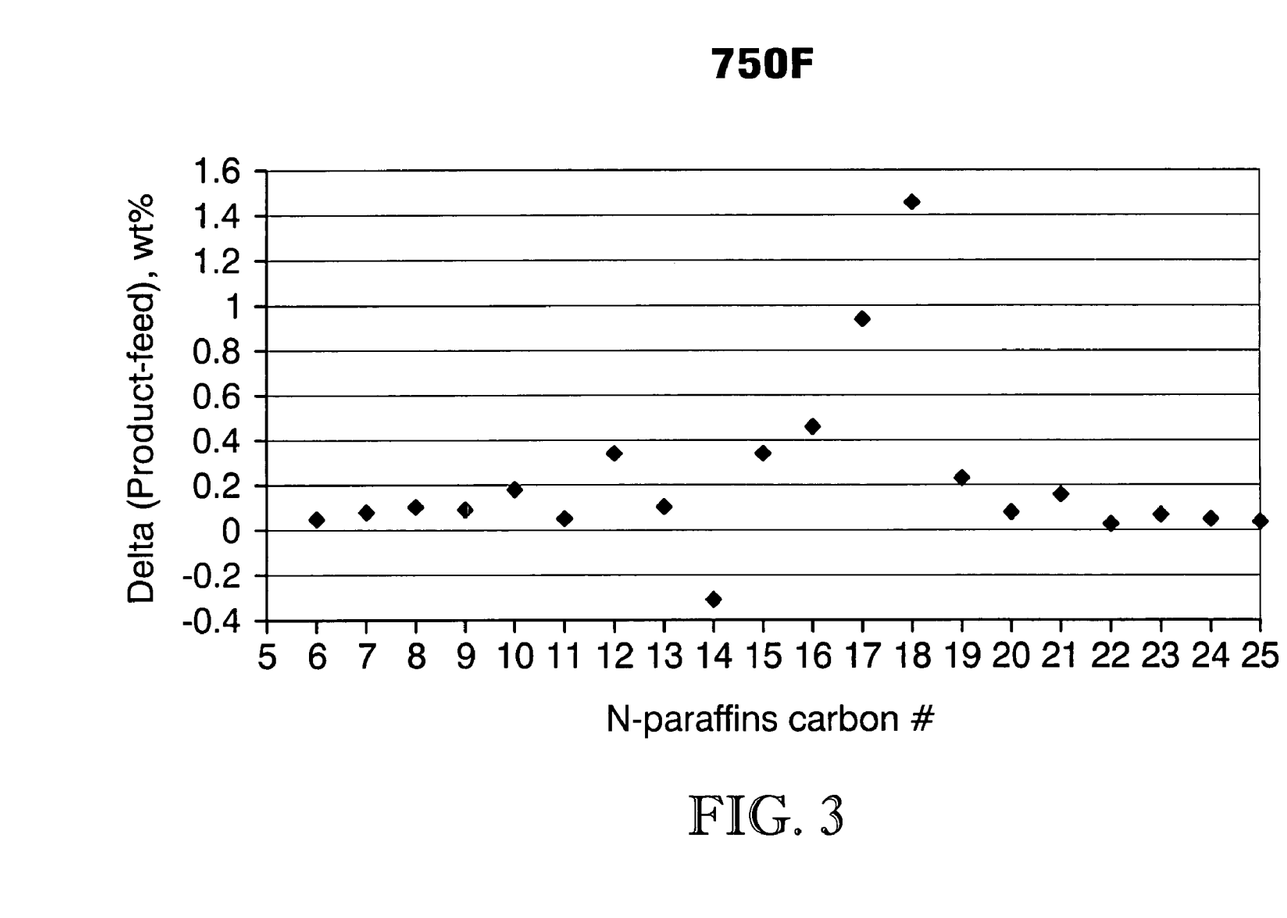
Figure 4:
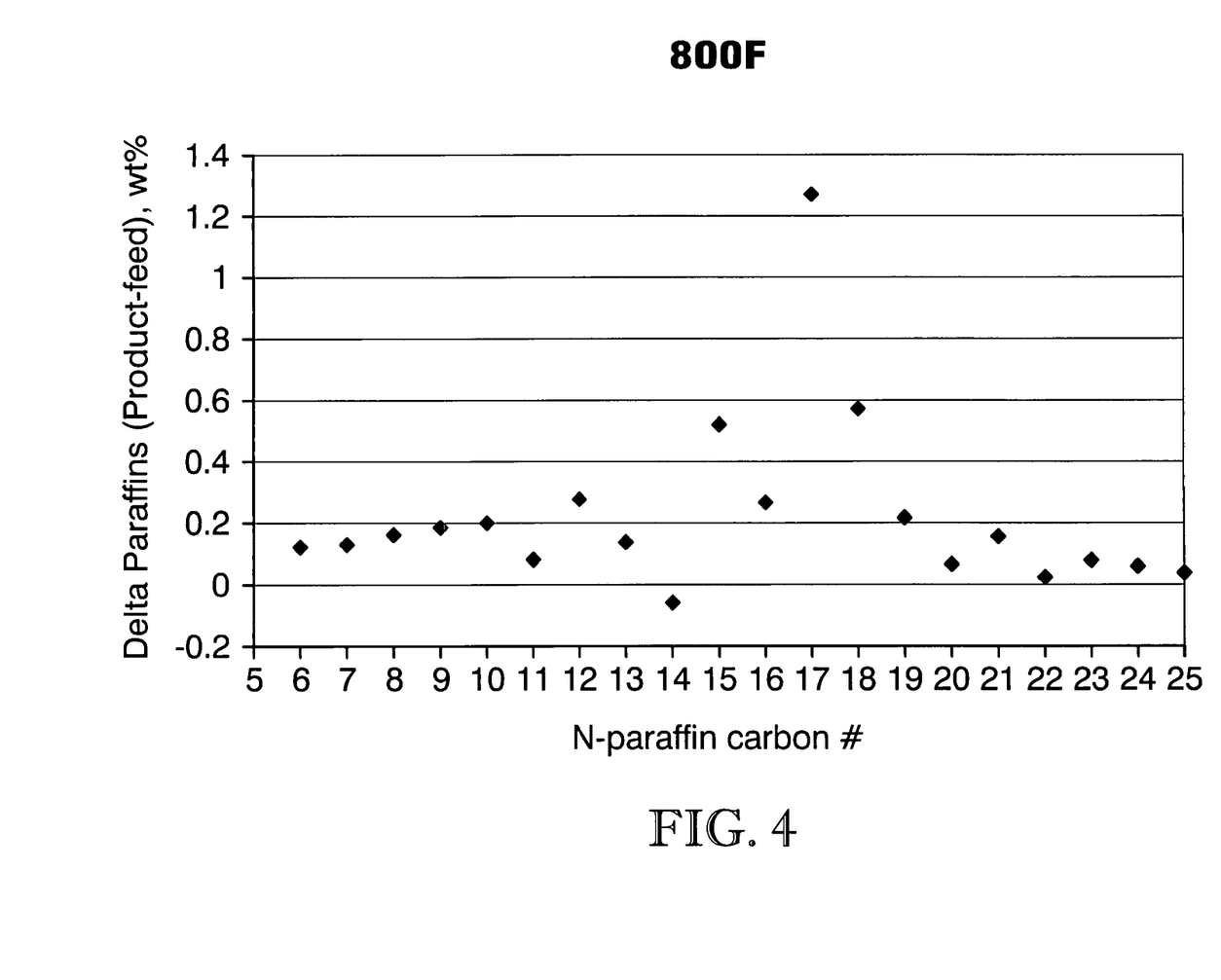

As shown in FIG. 1, there is little change in CND for LCO before and after the reaction. As shown in FIG. 4 for the reaction at 800° F., most of the vegetable oil was converted to $C_{15}$ to $C_{18}$ n-paraffins with $C_{15}$ and $C_{17}$ n-paraffins being more than $C_{16}$ and $C_{18}$ n-paraffins. Cracking of the side chains to other carbon number hydrocarbons is also observed. As shown in FIG. 3 for the reaction at 750° F., most of the vegetable oil was converted to $C_{15}$ to $C_{18}$ n-paraffins, but different from the reaction at 800° F. with $C_{16}$ and $C_{18}$ n-paraffins being present more than $C_{15}$ and $C_{17}$ n-paraffins. The cracked products to other carbon number hydrocarbons are also lower than the cracked products obtained at 800° F., which may be evident that the conversion of vegetable oil at 750° F. is more selectively cracked to $C_{15}$ to $C_{18}$ n-paraffins. The net CND at 700° F., as shown in FIG. 2, indicates that vegetable oil is very selectively converted to $C_{15}$ to $C_{18}$ n-paraffins together, more than 90 wt percent of the vegetable oil side chains were converted to the $C_{15}$ to $C_{18}$ n-paraffins with very high cetane number. It is also noted that the total $C_{15}$ to $C_{18}$ n-paraffins content for the run at 700° F. is much higher than the 750° F. and 800° F. runs indicating selectively converted to desirable n-paraffins with high cetane number. It is also noted than $C_{16}$ and $c_{18}$ n-paraffins are more than $C_{15}$ and $C_{17}$ n-paraffins for the reaction at 700° F.

EXAMPLE VI

This example illustrates the process of the present invention using a Fluorine promoted Ni—Mo catalyst. As shown in Table VIII below, products produced using a F/NiMo catalyst exhibited more n-$C_{17}$ production and lower cloud and pour points than the products produced using a non-fluorinated Ni—Mo catalyst. In runs G and H, a 20% yellow grease/80% LCO mixture was co-fed with hydrogen through a fixed-bed, down flow reactor under hydrotteating conditions and employing a catalyst containing nickel and molybdenum supported on $Al_2O_3$ (commercially available from Haldor Topsoe under the trade designation TK-573). The reaction conditions included an LHSV of 2 $HR^{-1}$, an $H_2$ flow rate of 3500 scf/b, and a temperature of 750° F. (run G) and 700° F. (run H). The pressure of the reaction was 150 psig. In runs I and J, a 20% yellow grease/80% LCO mixture was co-fed with hydrogen through a fixed-bed, down flow reactor under hydrotreating conditions and employing a catalyst containing nickel and molybdenum (commercially available from Haldor Topsoe under the trade designation TK-573) supported on $Al_2O_3$, with fluorine incorporated therein (by impregnating 1.5 grams ammonium bifluoride on 25 grams TK-573). The reaction conditions included an LHSV of 2 $hr^{-1}$, an $H_2$ flow rate of 3500 scf/b, and a temperature of 750° F. (run I) and 700° F. (run J). The pressure of the reaction was 150 psig.

TABLE VIII use of fluorine in catalyst.

| | Run Number | | | |
|---|---|---|---|---|
| | G | H | I | J |
| Feed | 20% Yellow Grease/ 80% LCO | 20% Yellow Grease/ 80% LCO | 20% Yellow Grease/ 80% LCO | 20% Yellow Grease/ 80% LCO |
| Catalyst | Ni/Mo ($Al_2O_3$) | Ni/Mo ($Al_2O_3$) | F—Ni/Mo ($Al_2O_3$) | F—Ni/Mo ($Al_2O_3$) |
| $H_2$ rate (scf/b) | 3500 scf/b | 3500 scf/b | 3500 scf/b | 3500 scf/b |
| Liquid SV ($hr^{-1}$) | 2 $hr^{-1}$ | 2 $hr^{-1}$ | 2 $hr^{-1}$ | 2 $hr^{-1}$ |
| Temperature | 750° F. | 700° F. | 750° F. | 700° F. |
| Pressure | 150 psig | 150 psig | 150 psig | 150 psig |
| n-$C_{17}$/n-$C_{18}$ | 1.90 | 1.54 | 1.98 | 1.85 |
| Cloud Point, ° F. | 24.5 | 27.1 | 15.0 | 17.0 |
| Pour Point, ° F. | 20.0 | 22.0 | 10.0 | 10.0 |
| Cetane Number | 42.74 | 43.19 | 38.89 | 39.52 |

As shown in Table VIII, products produced using a F/NiMo catalyst exhibited more n-$Cl_7$ production and lower cloud and pour points than the products produced using a non-fluorinated Ni—Mo catalyst.

EXAMPLE VIII

This example illustrates the process of the present invention using a Nickel/Zinc Oxide sorbent catalyst composition. As shown in Table IX below, products produced using a Nickel/Zinc Oxide sorbent catalyst composition exhibited more n-$C_{17}$ production than the products produced using a fluorinated Ni—Mo catalyst.

This example illustrates a process of converting triglyceride-containing materials to diesel boiling-range hydrocarbon products and properties of the products when produced in accordance with the present invention. This example specifically illustrates the effect of using a sorbent composition as catalyst. As shown in Table IX below, 100% soybean oil was co-fed with hydrogen through a fixed bed diesel reactor under hydrotreating conditions and employing a Ni—Mo fluorine incorporated catalyst (as prepared in accordance with Example VIII) (in Run K) and a sorbent (runs L and M) containing 14-18% nickel oxide and 48-55% zinc oxide and prepared in accordance with U.S. Pat. No. 6,429,170, incorporated herein by reference (denoted "sorbent" in Table IX below). The reaction conditions included an LHSV of 1 $hr^{-1}$, a pressure of 150 psig, and temperature of 750° F.

TABLE IX

Use of Sorbent v. F/Ni/Mo catalyst

| | Run Number | | |
|---|---|---|---|
| | K | L | M |
| Feed | 100% Vegetable Oil (Soybean) | 100% Vegetable Oil (Soybean) | 100% Vegetable Oil (Soybean) |
| Catalyst | F/Ni/Mo ($Al_2O_3$) | Sorbent | Sorbent |
| S added[1] | 1000 ppm | 1000 ppm | 0 |
| H2 rate (scf/b) | 3500 scf/b | 3500 scf/b | 3500 scf/b |
| Liquid SV ($hr^{-1}$) | 1 $hr^{-1}$ | 1 $hr^{-1}$ | 1 $hr^{-1}$ |
| Temperature | 750 F. | 750 F. | 750 F. |
| Pressure | 150 psig | 150 psig | 150 psig |
| n-$C_{17}$/n-$C_{18}$ | 2.43 | 5.64 | 5.53 |
| C1–C4 gas make, weight percent | 3.43 | 3.49 | 3.23 |

[1]Sulfur added to maintain catalyst activity.

All runs were tested for vegetable oil conversion by GC-wax method. One hundred percent vegetable oil conversion was found on all three samples. As shown in Table IX, products produced using a Nickel/Zinc Oxide sorbent catalyst composition exhibited more n-$C_{17}$ production than the products produced using a fluorinated Ni—Mo catalyst.

EXAMPLE IX

Figure 5:
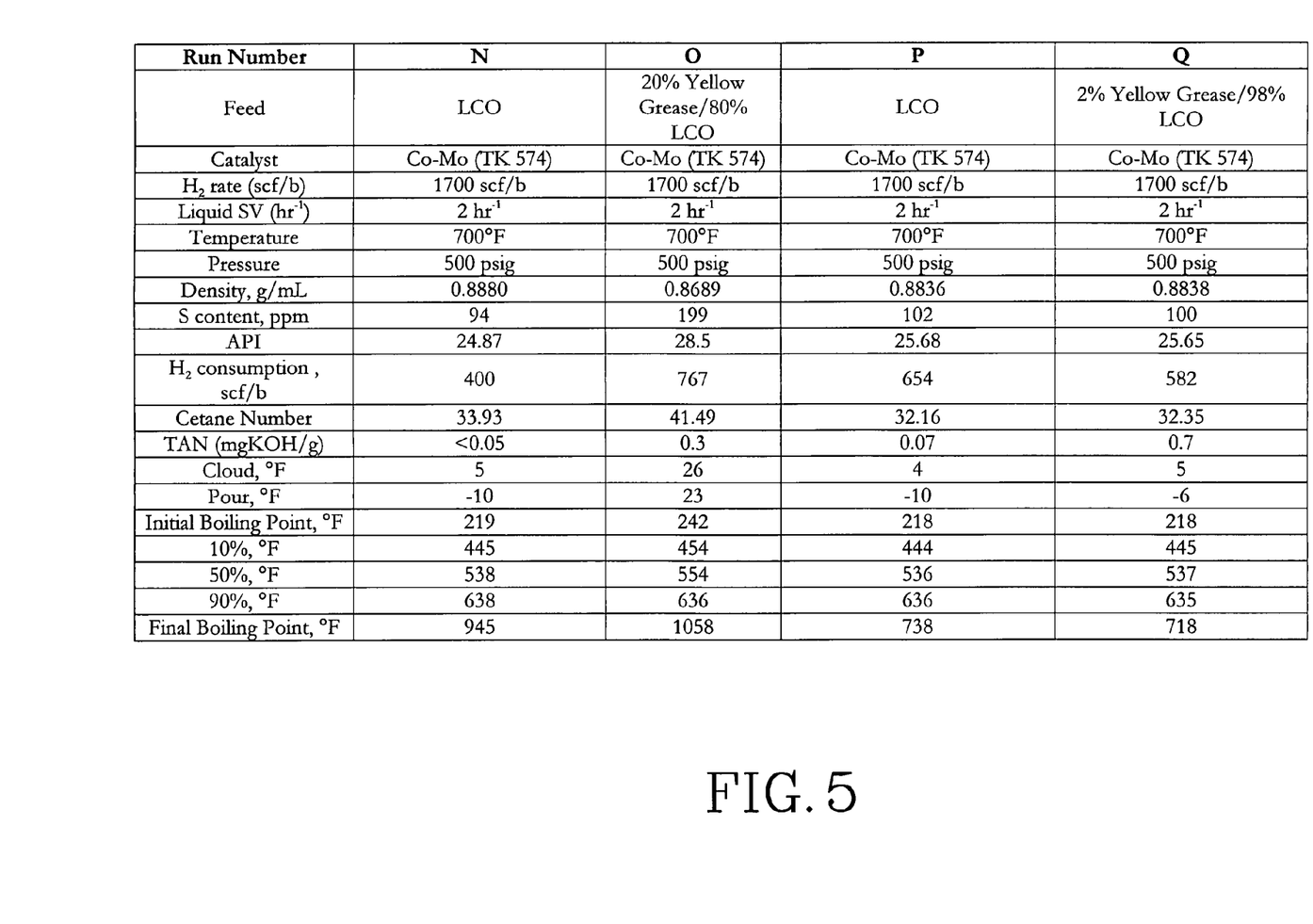
FIG. 5 is a table illustrating the effects of adding low amounts of oils and/or fats to the feed in accordance with one embodiment of the present invention.

This example illustrates the process of the present invention using low amounts of triglyceride compounds. As shown in FIG. 5, light cycle oil (LCO), and mixtures of LCO with yellow grease (2%) were co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $HR^{-1}$, an $H_2$ flow rate of 1700 scf/b, and a temperature of 700° F. The pressure of the reaction was 500 psig.

As shown in FIG. 5, adding 2% oil and fat in the feed exhibited a negligible impact on product properties, such as sulfur content, acid number, cetane number and cloud and pour points.

EXAMPLE X

This example illustrates a process according to the present invention to convert triglycerides, such as for example, vegetable oil with middle distillates, such as for example, gas oil, to diesel range hydrocarbons. As shown in Table X below, light vacuum gas oil and mixtures of light vacuum gas oil with yellow grease was co-fed with hydrogen through a fixed-bed, down flow reactor under hydrotreating conditions and employing a catalyst containing cobalt and molybdenum supported on $Al_2O_3$ (commercially available from Haldor Topsoe under the trade designation TK-574). The reaction conditions included an LHSV of 2 $HR^{-1}$, an $H_2$ flow rate of 1700 scf/b, and a temperature of 700° F. The pressure of the reaction was 500 psig.

TABLE X

| | Run Number | |
|---|---|---|
| | 1 | 2 |
| Feed | 100% light vacuum gas oil | 20% Yellow Grease/ 80% light vacuum gas oil |
| Catalyst | Co/Mo ($Al_2O_3$) | Co/Mo ($Al_2O_3$) |
| Liquid SV ($hr^{-1}$) | 2 $hr^{-1}$ | 2 $hr^{-1}$ |
| Temperature | 750° F. | 750° F. |
| Pressure | 500 psig | 500 psig |
| Product Cetane No. | 38.1 | 59.0 |
| Product TAN No. (mgKOH/g) | <0.05 | 0.07 |
| Cloud point, ° F. | 3 | 42 |
| Pour point, ° F. | 2 | 40 |
| Density, g/mL | 0.8492 | 0.8222 |
| Product S content, ppm | 257 | 308 |
| Diesel fraction product, weight percent | 34 | 51 |

As shown in Table X, yellow grease was converted to diesel range hydrocarbons by blending it with gas oil and processing the mixture under hydrotreating conditions. Adding 20% yellow grease to light vacuum gas oil increased the diesel yield from 34 to 51 weight percent and increased the cetane number of the diesel product from 38 to 59.

The results shown in the above examples, clearly demonstrate that the present invention is well adapted to carry out the objects and attain the ends and advantages mentioned as well as those inherent therein. Reasonable variations, modifications and adaptations may be made within the scope of this disclosure and the appended claims without departing from the scope of the invention.

What is claimed is:

1. A process comprising:
   contacting a hydrocarbon boiling in the temperature range of from about 80° F. to about 1000° F. and a triglyceride to form a mixture, and
   contacting the mixture with a hydrotreating catalyst in a fixed bed reactor under a condition sufficient to produce a reaction product containing diesel boiling range hydrocarbons,
   wherein the condition includes a pressure of less than about 600 psig and a temperature in the range of from about 600° F. to about 800° F.,
   wherein said reaction product has a greater amount of n-$C_{17}$ hydrocarbon products than n-$C_{18}$ hydrocarbon products.

2. The process of claim 1, wherein the condition includes a pressure in the range of from about 100 psig to about 300 psig.

3. The process of claim 1, wherein the condition includes a pressure of 150 psig.

4. The process of claim 1, wherein the condition includes contacting the mixture with a hydrogen-containing diluent in an amount in the range of from about 300 standard cubic feet per barrel of the mixture to about 4000 standard cubic feet per barrel of the mixture.

5. The process of claim 1, wherein the condition includes a liquid hourly space velocity in the range of from about 0.5 $hr^{-1}$ to about 4 $hr^{-1}$.

6. The process of claim 1, wherein the triglyceride is present in an amount in the range of from about 0.01 to about 100 weight percent, based on the weight of the mixture.

7. The process of claim 1, wherein the triglyceride is present in an amount in the range of from about 2 to about 80 weight percent, based on the weight of the mixture.

8. The process of claim 1, wherein the triglyceride is present in an amount of 100 weight percent.

9. The process of claim 1, wherein the hydrocarbon is selected from the group consisting of gasoline, naphtha, jet fuel, kerosene, diesel fuel, light cycle oil (LCO), vacuum gas oil, atmospheric gas oil, atmospheric tower bottom, and combinations of any two or more thereof.

10. The process of claim 1, wherein the triglyceride is selected from the group consisting of vegetable oil, yellow grease, animal fats and mixtures thereof.

11. The process of claim 1, wherein the hydrocarbon is LCO.

12. The process of claim 1, wherein the hydrocarbon is vacuum gas oil.

13. The process of claim 1, wherein the hydrotreating catalyst comprises nickel and molybdenum.

14. The process of claim 1, wherein the hydrotreating catalyst comprises cobalt and molybdenum.

15. The process of claim 1, wherein the hydrotreating catalyst further comprises fluorine.

16. The process of claim 14, wherein the hydrotreating catalyst further comprises fluorine.

17. The process of claim 1, wherein said reaction product comprises in the range of from about 0.5 weight percent to about 90 weight percent of hydrocarbons with 17 carbon atoms per molecule, based on the total weight of said reaction product.

18. The process of claim 1, wherein the reaction product has a total acidity number (TAN) of less than about 1.

19. The process of claim 1, wherein said catalyst is a sorbent comprising a promoter metal and zinc oxide.

20. The process of claim 19, wherein said sorbent further comprises an aluminate.

21. The process of claim 19, wherein said sorbent further comprises perlite.

22. The process of claim 19, wherein said promoter metal is selected form the group consisting of nickel, cobalt, iron, manganese, tungsten, silver, gold, copper, platinum, zinc, tin, ruthenium, molybdenum, antimony, vanadium, iridium, chromium, and palladium.

23. The process of claim 19, wherein the promoter metal is nickel.

24. The process of claim 19, wherein the promoter metal is present in a reduced valence state.

25. The process of claim 20, wherein said promoter metal is present as a substitutional solid metal solution with zinc.

26. The process of claim 20, wherein said aluminate is present in the form of a promoter metal-zinc aluminate substitutional solid solution.

27. The process of claim 19, wherein said zinc oxide is present in said sorbent composition in an amount in the range of from about 10 to about 90 weight percent, based on the total weight of said sorbent composition.

28. The process of claim 25, wherein said sorbent comprises said substitutional solid metal solution in an amount in the range of from about 5 to about 70 weight percent, based on the total weight of said sorbent composition.

29. The process of claim 26, wherein said promoter metal-zinc aluminate substitutional solid solution is present in an amount in the range of from about 2 to about 50 weight percent, based on the total weight of said sorbent composition.

30. A process comprising:
contacting a hydrocarbon boiling in the temperature range of from about 80° F. to about 1000° F. and a triglyceride to form a mixture, and
contacting the mixture with a hydrotreating catalyst in a fluidized bed reactor under a condition sufficient to produce a reaction product containing diesel boiling range hydrocarbons,
wherein the condition includes a pressure of less than about 600 psig and a temperature in the range of from about 600° F. to about 800° F.,
wherein the reaction product has a cetane number that is greater than the cetane number of the hydrocarbon,
wherein said reaction product has a greater amount of n-$C_{17}$ hydrocarbon products than n-$C_{18}$ hydrocarbon products.

31. The process of claim 30, wherein the condition includes a pressure in the range of from about 350 psig to about 550 psig.

32. The process of claim 30, wherein the condition includes a pressure of 500 psig.

33. The process of claim 30, wherein the triglyceride is present in an amount in the range of from about 0.01 to about 100 weight percent, based on the weight of the mixture.

34. The process of claim 30, wherein the triglyceride is present in an amount in the range of from about 2 to about 80 weight percent, based on the weight of the mixture.

35. The process of claim 30, wherein the triglyceride is present in an amount of 100 weight percent.

36. The process of claim 30, wherein the condition includes contacting the mixture with a hydrogen-containing diluent in an amount in the range of from about 300 standard cubic feet per barrel of the mixture to about 4000 standard cubic feet per barrel of the mixture.

37. The process of claim 30, wherein the condition includes a liquid hourly space velocity in the range of from about 0.5 $hr^{-1}$ to about 4 $hr^{-1}$.

38. The process of claim 30, wherein the hydrocarbon is selected from the group consisting of gasoline, naphtha, jet fuel, kerosene, diesel fuel, light cycle oil (LCO), vacuum gas oil, atmospheric gas oil, atmospheric tower bottom and combinations of any two or more thereof.

39. The process of claim 30, wherein the triglyceride is selected from the group consisting of vegetable oil, yellow grease, animal fats and mixtures thereof.

40. The process of claim 30, wherein the hydrocarbon is LCO.

41. The process of claim 30, wherein the hydrocarbon is vacuum gas oil.

42. The process of claim 30, wherein the catalyst is a sorbent comprising a promoter metal and zinc oxide.

43. The process of claim 42, wherein the sorbent further comprises an aluminate.

44. The process of claim 42, wherein said sorbent further comprises perlite.

45. The process of claim 42, wherein the promoter metal is selected form the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof.

46. The process of claim 42, wherein the metal promoter is nickel.

47. The process of claim 42, wherein the promoter metal is present in a reduced valence state.

48. The process of claim 42, wherein said promoter metal is present as a substitutional solid metal solution with zinc.

49. The process of claim 42, wherein said aluminate is present in the form of a promoter metal-zinc aluminate substitutional solid solution.

50. The process of claim 42, wherein said zinc oxide is present in said sorbent composition in an amount in the range of from about 10 to about 90 weight percent, based on the total weight of said sorbent composition.

51. The process of claim 48, wherein said sorbent comprises said substitutional solid metal solution in an amount in the range of from about 5 to about 70 weight percent, based on the total weight of said sorbent composition.

52. The process of claim 49, wherein said promoter metal-zinc aluminate substitutional solid solution is present in an amount in the range of from about 2 to about 50 weight percent, based on the total weight of said sorbent composition.

* * * * *

UNITED STATES PATENT AND TRADEMARK OFFICE
CERTIFICATE OF CORRECTION

PATENT NO.       : 7,550,634 B2
APPLICATION NO.  : 11/342888
DATED            : June 23, 2009
INVENTOR(S)      : Jianhua Yao et al.

It is certified that error appears in the above-identified patent and that said Letters Patent is hereby corrected as shown below:

Column 6, line 35, replace "usefull" with --useful--

Column 7, line 31, replace "die" with --the--

Column 7, line 62, replace "ate" with --are--

Please see attached sheets containing Replacement Tables II, III, IV, VIII, IX and X.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,550,634 B2
APPLICATION NO. : 11/342888
DATED : June 23, 2009
INVENTOR(S) : Jianhua Yao et al.

It is certified that error appears in the above-identified patent and that said Letters Patent is hereby corrected as shown below:

REPLACEMENT TABLE II:

| Run Number | CONTROL | C | E | F |
|---|---|---|---|---|
| Feed | 100% LCO | 20% Beef fat/ 80% LCO | 20% Used Restaurant Oil/ 80% LCO | 20% Vegetable Oil/80% LCO |
| Catalyst | Co/Mo ($Al_2O_3$) | Co/Mo ($Al_2O_3$) | Co/Mo ($Al_2O_3$) | Co/Mo ($Al_2O_3$) |
| $H_2$ rate (scf/b) | 1760 scf/b | 1760 scf/b | 1760 scf/b | 1760 scf/b |
| Liquid SV ($hr^{-1}$) | 2 $hr^{-1}$ | 2 $hr^{-1}$ | 2 $hr^{-1}$ | 2 $hr^{-1}$ |
| Temperature | 750°F | 750°F | 750°F | 750°F |
| Pressure | 500 psig | 500 psig | 500 psig | 500 psig |
| Product Cetane No. | 30.1 | 38.93 | 40.3 | 41.3 |

REPLACEMENT TABLE III:

| Run | CONTROL | E |
|---|---|---|
| Feed | 100% LCO | 20% Used Restaurant Oil/ 80% LCO |
| Catalyst | Co/Mo ($Al_2O_3$) | Co/Mo ($Al_2O_3$) |
| $H_2$ rate (scf/b) | 1760 scf/b | 1760 scf/b |
| Liquid SV ($hr^{-1}$) | 2 $hr^{-1}$ | 2 $hr^{-1}$ |
| Pressure | 500 psig | 500 psig |
| Product S ppm at 650°F | 157 | 486 |
| Product S ppm at 700°F | 44 | 180 |
| Product S ppm at 750°F | 55 | 47 |

UNITED STATES PATENT AND TRADEMARK OFFICE
CERTIFICATE OF CORRECTION

PATENT NO. : 7,550,634 B2
APPLICATION NO. : 11/342888
DATED : June 23, 2009
INVENTOR(S) : Jianhua Yao et al.

It is certified that error appears in the above-identified patent and that said Letters Patent is hereby corrected as shown below:

REPLACEMENT TABLE IV

| Run Number | E | B |
|---|---|---|
| Feed | 20% Used Restaurant Oil/80% LCO | 20% Used Restaurant Oil/80% LCO |
| Catalyst | Co/Mo ($Al_2O_3$) | Co/Mo ($Al_2O_3$) |
| $H_2$ rate (scf/b) | 1760 scf/b | 1760 scf/b |
| Liquid SV ($hr^{-1}$) | 2 $hr^{-1}$ | 2 $hr^{-1}$ |
| Feed TAN (mgKOH/g) | 2.91 | 2.91 |
| Temperature | 750°F | 750°F |
| Pressure | 500 psig | 150 psig |
| Product Cetane No. | 40.3 | 42.2 |
| Product TAN No. (mgKOH/g) | 4.44 | < 0.05 |
| $H_2$ consumption (scf/b) | 578 | 397 |
| n-$C_{17}$/n-$C_{18}$ ratio | 0.83 | 1.22 |
| Cloud Point (°F) | 34.1 | 27.4 |
| Pour Point (°F) | 24.0 | 21.0 |

REPLACEMENT TABLE VIII

| Run Number | G | H | I | J |
|---|---|---|---|---|
| Feed | 20% Yellow Grease/ 80% LCO | 20% Yellow Grease/ 80% LCO | 20% Yellow Grease/ 80% LCO | 20% Yellow Grease/ 80% LCO |
| Catalyst | Ni/Mo ($Al_2O_3$) | Ni/Mo ($Al_2O_3$) | F-Ni/Mo ($Al_2O_3$) | F-Ni/Mo ($Al_2O_3$) |
| $H_2$ rate (scf/b) | 3500 scf/b | 3500 scf/b | 3500 scf/b | 3500 scf/b |
| Liquid SV ($hr^{-1}$) | 2 $hr^{-1}$ | 2 $hr^{-1}$ | 2 $hr^{-1}$ | 2 $hr^{-1}$ |
| Temperature | 750°F | 700°F | 750°F | 700°F |
| Pressure | 150 psig | 150 psig | 150 psig | 150 psig |
| n-$C_{17}$/n-$C_{18}$ | 1.90 | 1.54 | 1.98 | 1.85 |
| Cloud Point, °F | 24.5 | 27.1 | 15.0 | 17.0 |
| Pour Point, °F | 20.0 | 22.0 | 10.0 | 10.0 |
| Cetane Number | 42.74 | 43.19 | 38.89 | 39.52 |

UNITED STATES PATENT AND TRADEMARK OFFICE
CERTIFICATE OF CORRECTION

PATENT NO.       : 7,550,634 B2
APPLICATION NO.  : 11/342888
DATED            : June 23, 2009
INVENTOR(S)      : Jianhua Yao et al.

It is certified that error appears in the above-identified patent and that said Letters Patent is hereby corrected as shown below:

REPLACEMENT TABLE IX

| Run Number | K | L | M |
|---|---|---|---|
| Feed | 100 % Vegetable Oil (Soybean) | 100 % Vegetable Oil (Soybean) | 100 % Vegetable Oil (Soybean) |
| Catalyst | F/Ni/Mo ($Al_2O_3$) | Sorbent | Sorbent |
| S added[1] | 1000ppm | 1000ppm | 0 |
| H2 rate (scf/b) | 3500 scf/b | 3500 scf/b | 3500 scf/b |
| Liquid SV ($hr^{-1}$) | 1 $hr^{-1}$ | 1 $hr^{-1}$ | 1 $hr^{-1}$ |
| Temperature | 750F | 750F | 750F |
| Pressure | 150 psig | 150 psig | 150 psig |
| $n\text{-}C_{17}/n\text{-}C_{18}$ | 2.43 | 5.64 | 5.53 |
| C1-C4 gas make, weight percent | 3.43 | 3.49 | 3.23 |

REPLACEMENT TABLE X

| Run Number | 1 | 2 |
|---|---|---|
| Feed | 100% light vacuum gas oil | 20% Yellow Grease/ 80% light vacuum gas oil |
| Catalyst | Co/Mo ($Al_2O_3$) | Co/Mo ($Al_2O_3$) |
| Liquid SV ($hr^{-1}$) | 2 $hr^{-1}$ | 2 $hr^{-1}$ |
| Temperature | 750°F | 750°F |
| Pressure | 500 psig | 500 psig |
| Product Cetane No. | 38.1 | 59.0 |
| Product TAN No. (mgKOH/g) | <0.05 | 0.07 |
| Cloud point, °F | 3 | 42 |
| Pour point, °F | 2 | 40 |
| Density, g/mL | 0.8492 | 0.8222 |
| Product S content, ppm | 257 | 308 |
| Diesel fraction product, weight percent | 34 | 51 |